United States Patent
Carlström et al.

Patent Number: 5,251,274
Date of Patent: Oct. 5, 1993

[54] OPTICAL FIBRE CABLE FOR DETECTING A CHANGE IN TEMPERATURE

[75] Inventors: Bengt J. A. Carlström, Göteborg; Gunnar S. Forsberg, Stockholm, both of Sweden

[73] Assignee: Telefonaktiebolaget LM Ericsson, Stockholm, Sweden

[21] Appl. No.: 844,592
[22] PCT Filed: Oct. 2, 1990
[86] PCT No.: PCT/SE90/00632
§ 371 Date: May 5, 1992
§ 102(e) Date: May 5, 1992
[87] PCT Pub. No.: WO91/05230
PCT Pub. Date: Apr. 18, 1991

[30] Foreign Application Priority Data
Oct. 2, 1989 [SE] Sweden ............... 8903229

[51] Int. Cl.$^5$ .............................. G02B 6/02
[52] U.S. Cl. ................... 385/13; 385/128; 385/140; 250/227.16; 374/17
[58] Field of Search ............... 385/12, 13, 27, 28, 385/29, 126, 127, 128, 140; 250/227.16, 227.14; 374/17, 141, 142, 143, 159, 161

[56] References Cited

U.S. PATENT DOCUMENTS

| | | | |
|---|---|---|---|
| 4,417,782 | 11/1983 | Clarke et al. | 385/13 |
| 4,463,254 | 7/1984 | Asawa et al. | 250/227.16 |
| 4,713,538 | 12/1987 | Theocharous | 250/227.23 |
| 4,729,627 | 3/1988 | Saito et al. | 385/13 |
| 4,767,219 | 8/1988 | Bibby | 374/123 |

FOREIGN PATENT DOCUMENTS

| | | |
|---|---|---|
| 0188512 | 8/1988 | European Pat. Off. |
| 57-111424 | 7/1982 | Japan |
| 59-50676 | 3/1984 | Japan |
| 59-203929 | 11/1984 | Japan |
| 62-69131 | 3/1987 | Japan |
| 62-69132 | 3/1987 | Japan |

*Primary Examiner*—Frank Gonzalez
*Attorney, Agent, or Firm*—Burns, Doane, Swecker & Mathis

[57] ABSTRACT

An optical fibre cable has an optical fibre with a core and cladding that is embraced by a cover of polymer material. In a limited temperature detection range the polymer material has a negative coefficient of heat expansion, the absolute value of which is larger than the coefficient of heat expansion in temperature detection ranges adjacent the limited temperature detection range. When subjected to an increase in temperature, the cover will contract and cause microbending of the optical fibre. Light travelling in the fibre is attenuated and reflected, and the reflected light will be attenuated further in a heated domain of the fibre. The size of the domain and its position along the fibre can be determined by measuring the running time of the light. The polymer cover has a coefficient of heat expansion that enables several heated domains to be detected. The fibre attenuates the light in a range of 0.01–0.1 dB/m in the heated state of the fibre.

9 Claims, 5 Drawing Sheets

FIG_2
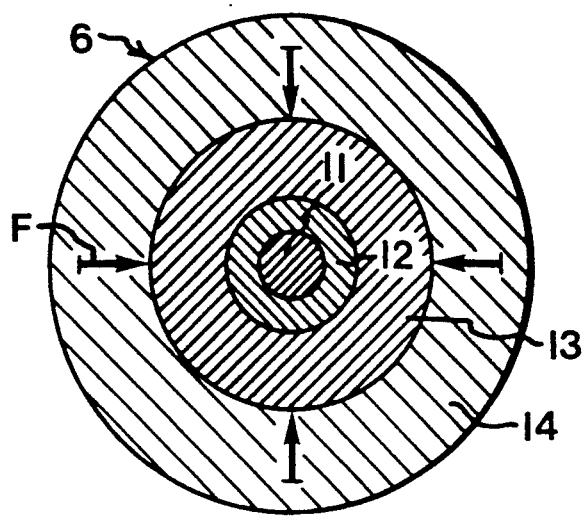
FIG_3
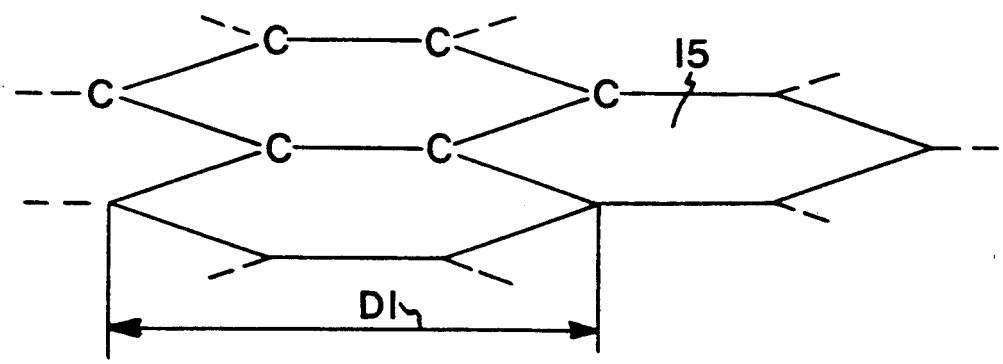
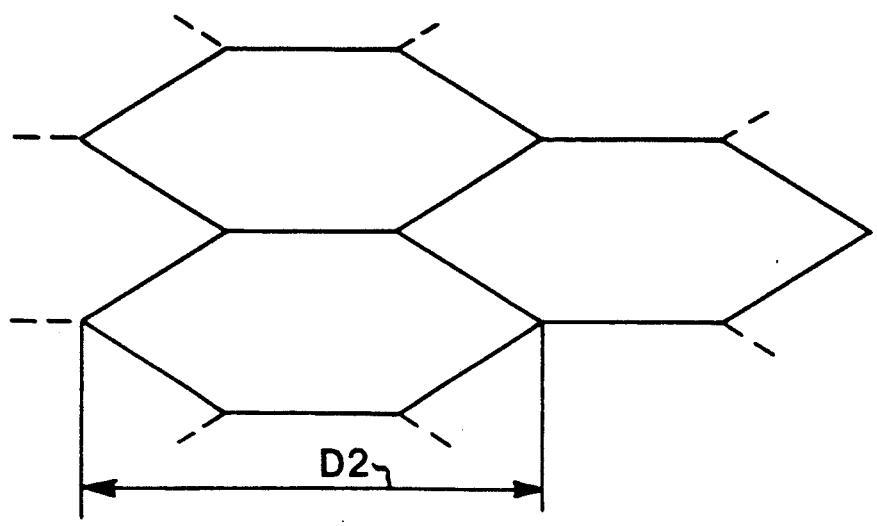

FIG._4
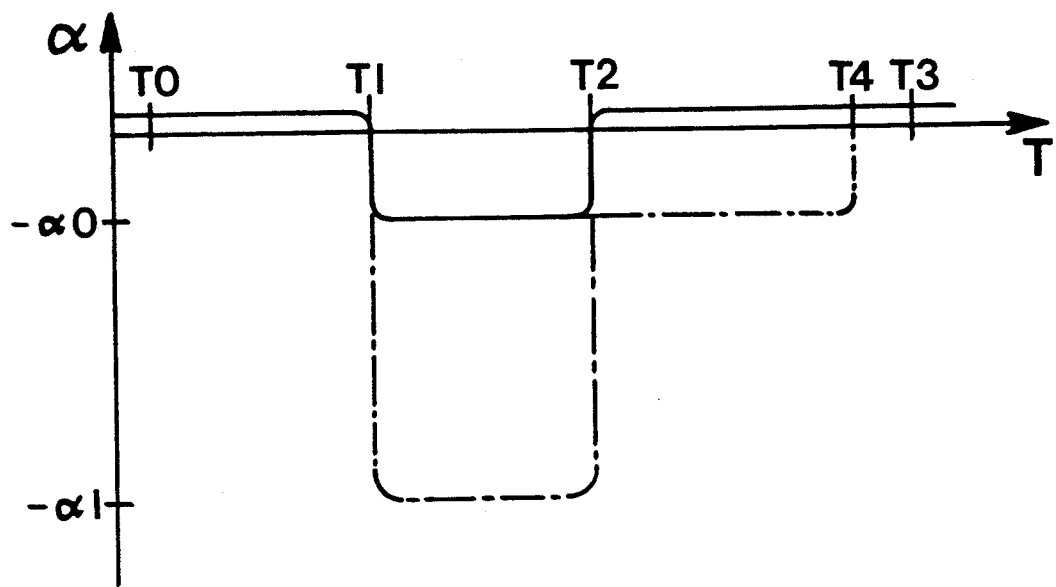
FIG.5
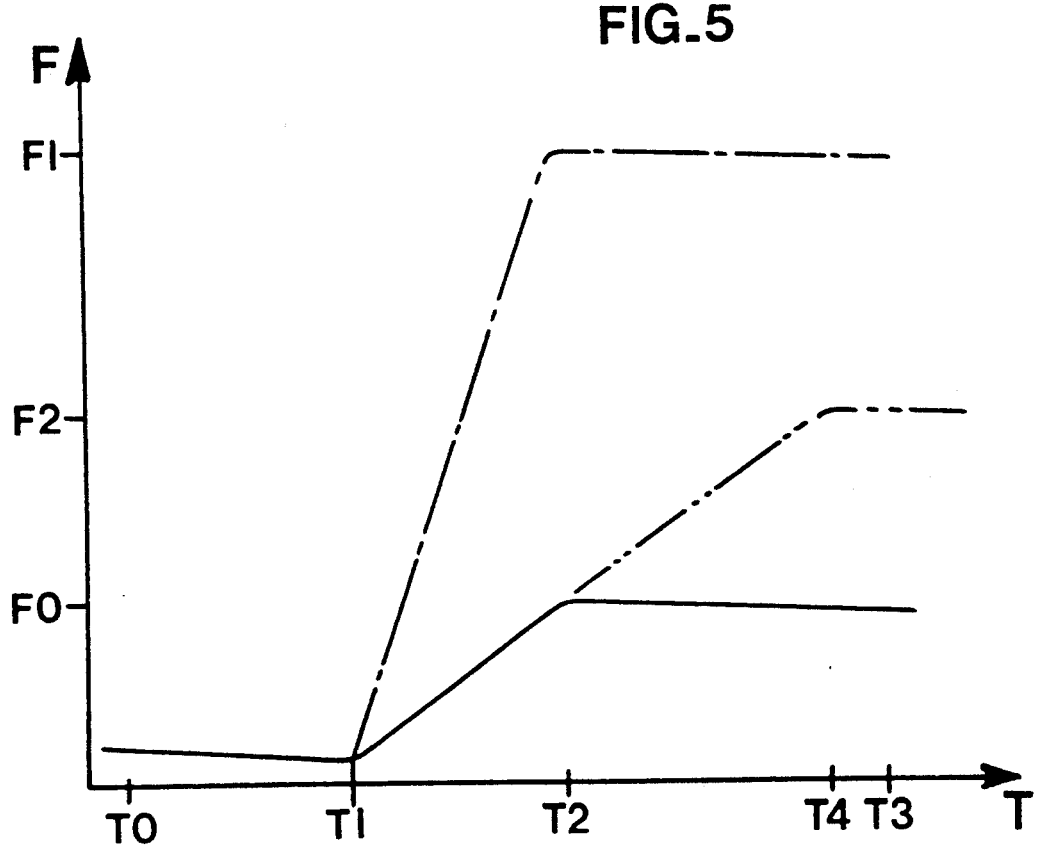

FIG_7
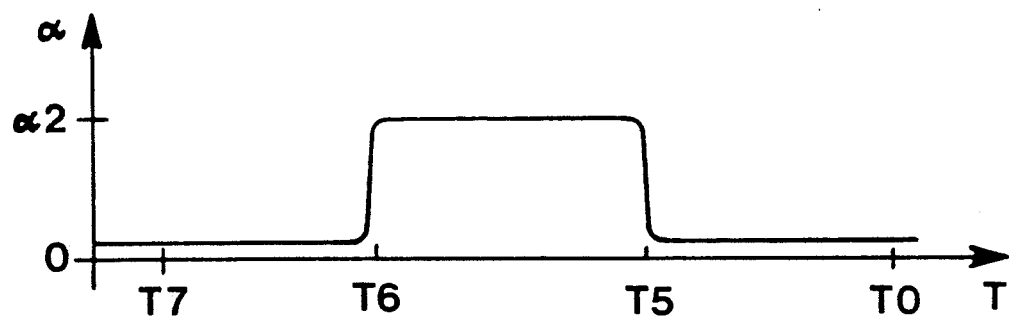
FIG_8
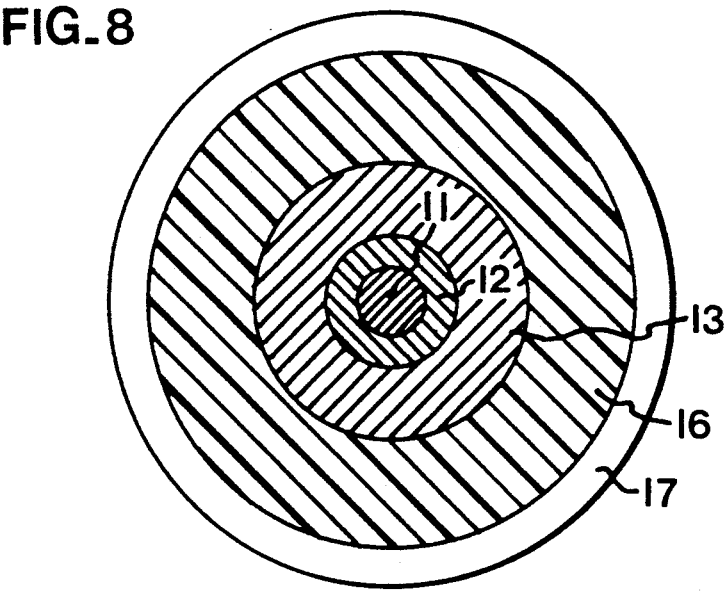
FIG_9
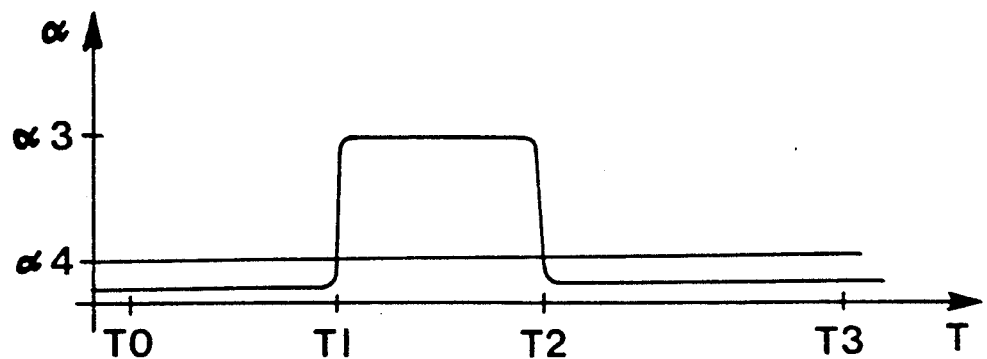

OPTICAL FIBRE CABLE FOR DETECTING A CHANGE IN TEMPERATURE

TECHNICAL FIELD

The present invention relates to an optical fibre cable for detecting a change in temperature, which fibre cable comprises an optical fibre with a core and a cladding having separate refractive indexes, and a temperature-responsive device which surrounds the optical fibre along at least a part of its length, wherein in a non-influenced state of the fibre cable, a light pulse having been sent into the fibre from its one end will be attenuated substantially uniformly along the length of the fibre, and upon microbending of the optical fibre caused by the temperature-responsive device, the light pulse will be further attenuated.

BACKGROUND ART

Microbending will occur in an optical fibre which is subjected to an external force, with subsequent light attenuation. Although this is a disadvantage in signal transmission, microbending can be utilized in a manner which will enable the fibre to be used as a detector or sensor element. An example of one such force detecting element is found described in European Patent Specification Number 0188512. An optical fibre having a core and cladding is embraced by a primary cover, and a twisted tape is disposed between the cladding and the primary cover. The twisted tape is responsible for the microbending when a force is exerted on the fibre.

A fibre cable for detecting temperature is illustrated in Japanese Patent Application No. 59-50676. The optical-fibre cladding has wound therearound a wire consisting of memory-metal, which contracts when exposed to a given detection temperature and therewith exerts pressure on the cladding and causes microbending of the fibre. Each molecule in the fibre core reflects light by Rayleigh-scattering and the intensity of the light reflected is directly proportional to the intensity of the passing light pulse. The intensity of the reflected light pulse decreases as a result of microbending of the fibre. The reflected light pulse can be detected and the position at which microbending occurs along the fibre can be established by so-called OTDR, Optical Time Domain Reflectometry. The drawback with this device is that in many applications it is difficult to obtain a memory metal which will produce microbends of desired sizes and at desired temperatures. The device is also relatively complicated to manufacture.

DESCRIPTION OF THE INVENTION

According to the invention, an optical fibre has a casing made of polymer material, the coefficient of heat expansion of which has a desired value in a limited temperature range. The value of the coefficient of heat expansion can be chosen by appropriate choice of the polymer material. Either a positive or a negative coefficient can be chosen and the limits of the temperature range can be chosen through selection of the polymer material. This enables the optical fibre with its casing, the fibre cable, to be given the desired attenuation properties.

BRIEF DESCRIPTION OF THE DRAWINGS

An exemplifying embodiment of the inventive fibre cable will now be described in more detail with reference to the accompanying drawings, in which

FIG. 2 illustrates the fibre cable in cross-section;

FIG. 3 is a schematic illustration of the structure of a polymer material;

FIG. 4 is a diagram of the coefficient of heat expansion of the polymer material;

FIG. 5 is a diagram of the force-effect achieved at different temperatures;

FIG. 7 illustrates the coefficient of heat expansion of an alternative polymer material;

FIG. 8 is a cross-sectional view of an alternative embodiment of the fibre cable; and FIG. 9 is a diagram showing the coefficient of heat expansion of the materials in the alternative fibre cable of FIG. 8.

BEST MODE OF CARRYING OUT THE INVENTION

Figure 1:
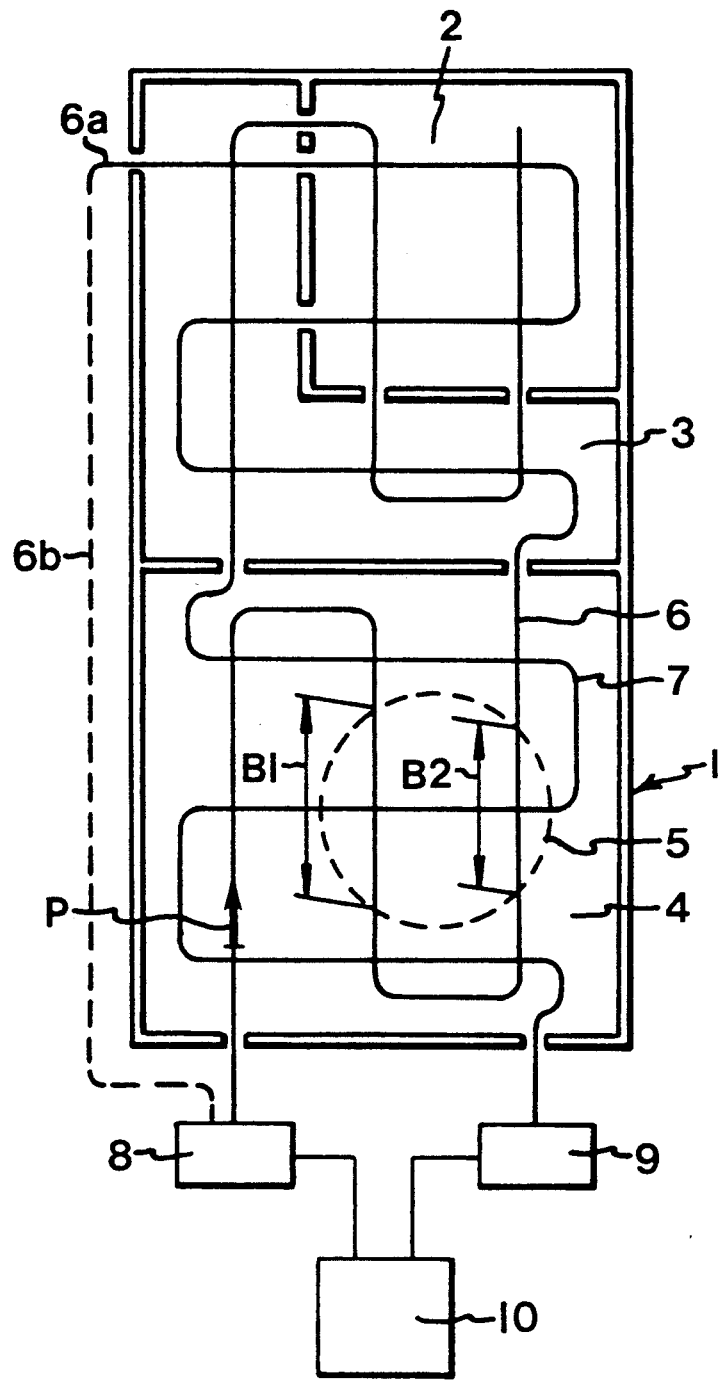
FIG. 1 illustrates schematically a building with the fibre cable and a monitoring system.

FIG. 1 illustrates schematically a building 1, for instance a greenhouse, whose temperature is to be monitored. The greenhouse is divided into several rooms 2, 3, 4 and it is of interest to be able to monitor each room individually. It can also be of interest to be able to detect whether or not a small area 5 of one room has an elevated temperature, such as to expose plants in this part of the room to the risk of injury. The monitoring process is effected with the aid of temperature-responsive optical fibre cables 6 and 7, which are connected to an OTDR-system 8, 9 having a control unit 10. OTDR is an acronym for Optical Time Domain Reflectometry and, in brief, functions to transmit light pulses of short duration through the fibre, from one end thereof. When the fibre is subjected to an external influence within a domain, the attenuation in the fibres increases as a result of microbending of the fibre. As a result of the aforesaid Rayleigh-scattering, the light pulses are reflected back to said one end of the fibre and the reflected light pulses are attenuated in the influenced domain. The reflected pulses are detected and the location at which the influence has been exerted can be determined by measuring the running time of the light pulses. A more exhaustive description of OTDR is found, for instance, in U.S. Pat. Nos. 4,463,254 and 4,713,538.

The optical fibre cables 6 and 7 are inventive, and an exemplifying embodiment of these cables will now be described in more detail. FIG. 2 is a cross-sectional view of the fibre cable 6 comprising a core 11, a cladding 12 and a primary cover 13 of an optical fibre. In accordance with the invention, a casing 14 of polymer material is disposed externally on the primary cover 13. The casing extends along at least a part of the fibre cable 6, and in the illustrated embodiment, the polymer is an amide resin. Further protective covers can be disposed on the casing 14. The amide resin is composed chemically of carbon rings 15 containing six carbon atoms, as indicated by the reference C in FIG. 3. This material can be treated in manufacture in a manner to extend the carbon rings in a non-influenced state at a temperature T0, such that the rings will have a length dimension of D1 in said direction. When this material is subjected to an elevated temperature, the carbon rings contract in their longitudinal direction, to a length extension of D2. This change is reversible, so that the carbon rings return to their larger length D1 at the lower temperature T0. The amide material obtains, in this way, a coefficient of heat expansion $\alpha$ which varies with temperature, referenced T, as illustrated in FIG. 4. The coefficient $\alpha$ has a value of small magnitude within a first range extending from the temperature T0 to a temperature T1. In a temperature detection range intended for the fibre cable 6 and lying between the temperature T1 and a temperature T2, the coefficient of heat expansion has a negative value of magnitude $\alpha 0$. In a temperature range between the temperature T2 and a temperature T3, the coefficient of heat expansion has again a low value, which is negligible in relation to the value $\alpha 0$. It should be noted that the expression "coefficient of heat expansion" is a somewhat improper term, since the expansion can be negative at increasing temperatures.

Figure 6:
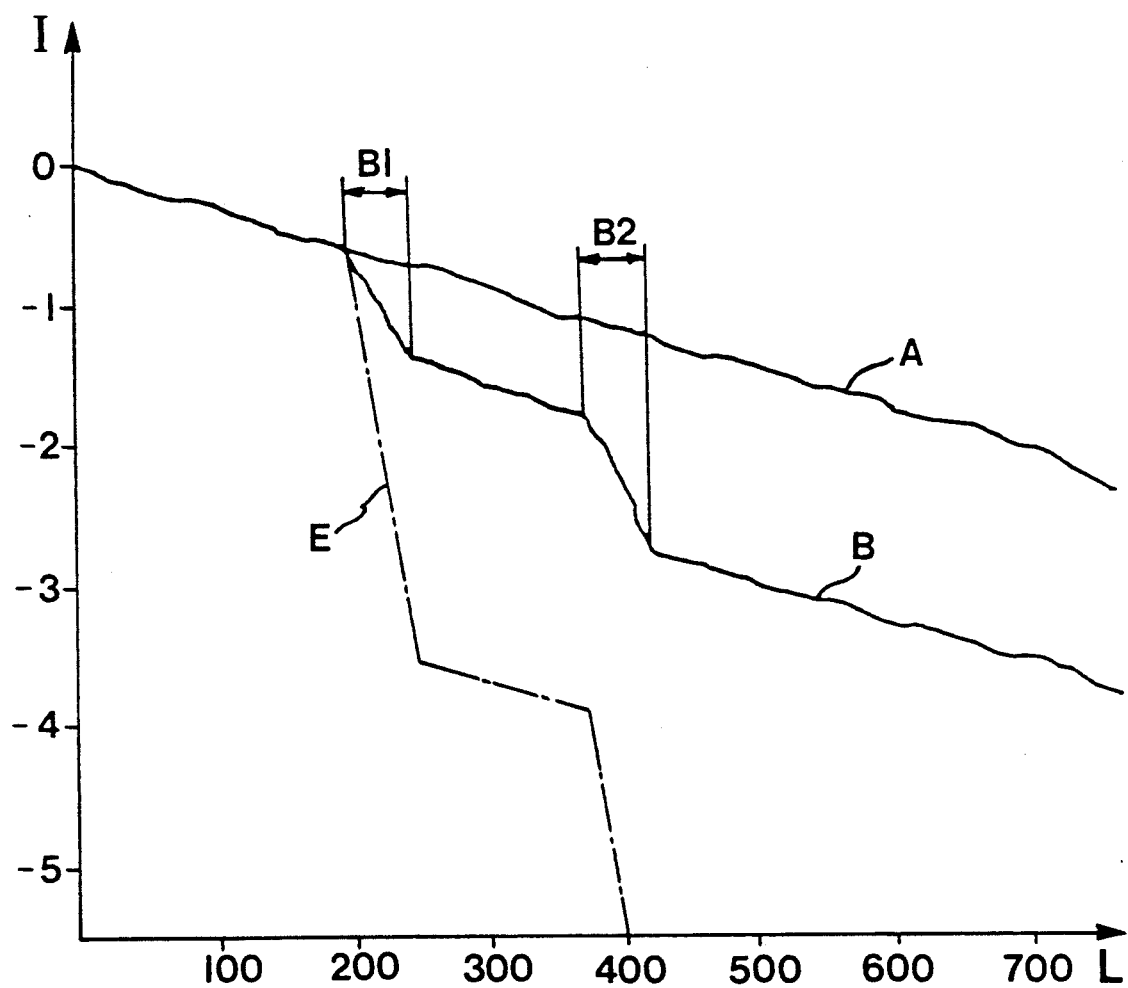
FIG. 6 illustrates the attenuation of a light pulse along the fibre cable.

The amide casing 14 exerts on the primary cover 13 a force F which varies in the fashion illustrated in the diagram shown in FIG. 5. The force F is almost constant in the temperature range up to temperature T1. In the temperature detection range T1-T2, the force F increases successively to a force F0 and again remains almost constant in the range above temperature T2. The force F exerted on the primary cover 13 causes the aforesaid microbending by means of which the light in the fibre cable 6 is attenuated and reflected, as will be described with reference to FIG. 6.

This Figure is a diagram which shows the light intensity I along the length L of the fibre cable 6 for a light pulse P which is transmitted from an OTDR-unit 8 illustrated in FIG. 1. The intensity is given as an attenuation in decibels, dB, and the length L is given in meters. A curve A illustrates attenuation for the fibre cable 6 in a non-influenced state, when the temperature in the rooms 2, 3 and 4 is lower than T1. A curve B shows the attenuation of the light pulse P when the temperature in the domain 5 exceeds the temperature T1. The polymer casing 14 of the fibre cable 6 contracts in the domain 5, corresponding to the range B1 and B2 of the fibre cable, and causes microbending of the optical fibre, resulting in higher attenuation of the light pulse P. It is essential that the increased attenuation, measured as dB/m, has a value such that the Rayleigh-reflected pulse can be safely detected and separated from among the interferences which occur, for instance, as a result of the normal variations in attenuation in the optical fibre. It is also essential that attenuation for each meter of fibre will not be too excessive, since it is desired to be able to detect several ranges of elevated temperature along the fibre, such as the ranges B1 and B2 for instance. As illustrated by the curve E, when the attenuation per unit of length is very pronounced, the light wave P will be so powerfully attenuated that only the first range B1 can be detected. The strong attenuation according to curve E can be caused by the fact that the polymer casing 14 has a large coefficient of heat expansion of magnitude $\alpha 1$ in the temperature range T1-T2, as illustrated in FIG. 4. This coefficient of heat expansion is corresponded by a force F1 on the primary cover 13 at the temprature T2, as illustrated in FIG. 5. Pronounced attenuation can also be caused by the fact that the coefficient of heat expansion of the polymer casing is $\alpha 0$ within a large temperature range, e.g. between the temperature T1 and a temperature T4. Such a casing will exert a force F2 on the primary cover of the fibre at the temperature T4 according to FIG. 5 and consequently the light attenuation will essentially follow the curve E in FIG. 6. This attenuation of the light pulse P caused in the fibre does not only depend, however, on the coefficient $\alpha$ of heat expansion and the extent of the temperature range, but also on the intrinsic properties of the core 11, cladding 12 and primary cover 13 of the optical fibre. The final attenuation properties can be established by measuring the fibre cable and an attenuation suitable for many applications lies in a range of 0.01-0.1 dB/m within the desired temperature range of T1-T2.

In the aforedescribed example, an OTDR-system has been used to detect the reflected light pulse in the inventive fibre cable 6. This fibre cable can also be used to detect the attenuated light pulse P at the distal end 6a of the fibre cable 6 in FIG. 1. In the illustrated case, the distal end of said cable is connected to the unit 8 through an optical fibre 6b, as illustrated by a broken line in said Figure. In the illustrative example, the attenuated light pulse P has the intensity I = -3.8 dB according to the curve B in FIG. 6. However, when detecting the attenuated light pulse it is only possible to establish that an increase in temperature has occurred somewhere along the fibre, and the actual location of this temperature increase remains unknown. It may be of interest to have knowledge of this location and the location can be established relatively precisely, particularly when the two fibre cables 6 and 7 are used in the manner illustrated in FIG. 1 for detection purposes.

A number of trials have been carried out with inventive fibre cables. In one of these trials there was used an optical standard fibre provided with a casing 14 of amide resin. The fibre core 11 had a diameter 62.5 microns, whereas the cladding 12 had a diameter of 125 microns and the primary cover 13 a diameter of 250 microns. The trial showed that separate amide-resin materials could be chosen which together with the standard fibre gave the desired attenuation values within the aforesaid range of 0.01-0.1 dB/m. The temperature range T1-T2 in this trial had a span of 8° C. Trials were also carried out in which the casing 14 was made from other polymer materials, such as carbon-fibre material for instance. Similar to the aforesaid amide materials, these carbon fibre materials comprise extended or stretched carbon rings and have a negative coefficient of heat expansion within a limited temperature range.

In the above embodiment the optical fibre cable 6 has been described as suitable for use in detecting an increase in temperature, it being desired to hold this increase beneath a given value. In accordance with an alternative embodiment of the invention, the polymer casing around the optical fibre, corresponding to the casing 14, has a positive coefficient of heat expansion, as illustrated in FIG. 7. The coefficient of heat expansion within a temperature range of T5-T6 is $\alpha 2$. The value of the coefficient of heat expansion in the temperature ranges T0-T5 and T6-T7 on respective sides of the aforesaid temperature range is small in comparison with the value $\alpha 2$. When the temperature falls, the polymer casing contracts within the temperature range of T5-T6 and causes microbending of the optical fibre in a manner corresponding to that described with reference to the fibre cable 6. Polyvinyl chloride, PVC-plastic, is an example of material having a positive coefficient of heat expansion. The optical fibre cable according to this alternative embodiment is utilized to monitor a temperature which shall be maintained above a given value.

Such temperature monitoring processes can be employed in foodstuff refrigerating rooms in which freezing of the foodstuffs shall not occur.

Alternative, inventive embodiments of the aforedescribed fibre cables will now be described with reference to FIG. 8. This Figure illustrates the earlier mentioned standard fibre, comprising core 11, cladding 12 and primary cover 13. The primary cover is embraced by a casing 16 of polymer material, which in turn is embraced by a secondary protective cover 17. The coefficient of heat expansion of the polymer casing 16 is shown in FIG. 9. In the first temperature range of T0-T1 and the second temperature range of T2-T3, the coefficient of heat expansion has a value close to zero. In the temperature detecting range T1-T2, the coefficient of longitudinal expansion has a positive value of magnitude $\alpha 3$. The secondary protective cover 17 has a positive coefficient of heat expansion of magnitude $\alpha 4$, which is relatively small in comparison with $\alpha 3$. When the temperature rises, the polymer casing 16 expands markedly in the temperature detection range T1-T2, whereas the size of the secondary protective cover 17 remains relatively unchanged. The outer diameter of the polymer casing 16 changes slightly, and at temperatures above the temperature T1 the casing 16 will exert pressure on the primary protective cover 13. This results in microbending of the fibre, in a manner corresponding to that described with reference to FIG. 5 and FIG. 6. Further alternative embodiments of the inventive fibre can be mentioned. In the aforedescribed examples, the core 11 of the optical fibre is concentrical with the polymer casing. The fibre, however, can also be positioned non-centrically, so that the primary protective cover of the FIG. 8 embodiment lies against the inner surface of the secondary protective cover 17. The space thus defined between the primary cover 13 and the secondary cover 17 is filled with a polymeric material which when subjected to changes in temperature presses the primary cover 13 against the inner surface of the secondary cover 17 and therewith produces microbending of the fibre. The inner surface of the secondary cover may be provided with promontories in order to amplify the microbending. Foamed polyurethane is an example of polymeric material suitable for use in this embodiment.

With regard to the embodiment illustrated in FIG. 2, rubber can be mentioned as a further example of material and material combinations for the polymer casing of this construction. According to this embodiment, both the primary cover 13 and the polymer casing 14 can be made of acrylate plastics of mutually different hardnesses, the primary cover 13 being softer than the casing 14. This is an advantageous embodiment from the aspect of manufacture.

We claim:

1. An optical fibre cable for detecting a change in temperature, said optical fibre cable comprising an optical fibre that includes a core and a cladding having different refractive indexes, and a temperature-responsive device comprised of a casing of polymer material which surrounds the optical fibre along at least a part of its length, said polymer material having a coefficient of heat expansion within a limited temperature detection range which is large in comparison with the coefficient of heat expansion of the polymer material in temperature detection ranges that are adjacent said limited temperature detection range such that a light pulse which is sent into the fibre from one end thereof will be attenuated substantially uniformly along parts of the fibre where the temperature-responsive device is subjected to a temperature within said adjacent temperature detection ranges and said light pulse is further attenuated along parts of the fibre where the temperature-responsive device is subjected to a temperature within said limited temperature detection range, the attenuation of the light pulse in parts of the fibre where the temperature-responsive device is subjected to a temperature within the limited temperature detection range being in a range of between 0.01 to 0.1 decibels per meter of fibre cable, depending on the composition of said polymer material.

2. An optical fibre cable according to claim 1, wherein the polymer material has a negative coefficient of heat expansion in the limited temperature detection range.

3. An optical fibre cable according to claim 1, wherein the polymer material in said casing is chemically comprised of rings of carbon atoms, said rings being elongated when subjected to temperatures up to the limited temperature detection range and changing their shape by contraction in their longitudinal directions when subjected to temperatures in the limited temperature detection range.

4. An optical fibre cable according to claim 3, wherein the polymer material is an amide plastic or carbon fibre material.

5. An optical fibre cable according to claim 1, wherein the polymer material has a positive coefficient of heat expansion in the limited temperature detection range.

6. An optical fibre cable according to claim 1, wherein the temperature-responsive device also includes a secondary protective cover which embraces the casing of polymer material, said secondary protective cover having a coefficient of heat expansion in the limited temperature detection range and the adjacent temperature detection ranges, the magnitude of said coefficient of heat expansion of said secondary protective cover being smaller than the magnitude of the coefficient of heat expansion of the casing of polymer material in the limited temperature detection range.

7. An optical fibre cable according to claim 2, wherein the polymer material in said casing is chemically comprised of rings of carbon atoms, said rings being elongated when subjected to temperatures up to the limited temperature detection range and changing their shape by contraction in their longitudinal directions when subjected to temperatures in the limited temperature detection range.

8. An optical fibre cable according to claim 3, wherein said rings of carbon atoms include rings of the six carbon atoms.

9. An optical fibre cable according to claim 7, wherein said rings of carbon atoms include rings of the six carbon atoms.

* * * * *